(12) United States Patent
Meylan et al.

(10) Patent No.: US 9,215,688 B2
(45) Date of Patent: Dec. 15, 2015

(54) DATA TRANSMISSION METHOD, BASE STATION AND TERMINAL

(71) Applicant: Huawei Technologies Co., Ltd., Shenzhen, Guangdong (CN)

(72) Inventors: Arnaud Meylan, Shenzhen (CN); Xiaoan Fan, Shenzhen (CN); Junhui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 13/707,786

(22) Filed: Dec. 7, 2012

(65) Prior Publication Data

US 2013/0100873 A1  Apr. 25, 2013

Related U.S. Application Data

(63) Continuation of application No. PCT/CN2011/074030, filed on May 13, 2011.

(30) Foreign Application Priority Data

Jun. 7, 2010 (CN) .......................... 2010 1 0195891

(51) Int. Cl.
*H04W 72/00* (2009.01)
*H04L 12/18* (2006.01)
(Continued)

(52) U.S. Cl.
CPC ........... *H04W 72/005* (2013.01); *H04L 12/189* (2013.01); *H04L 12/5895* (2013.01); *H04W 72/042* (2013.01)

(58) Field of Classification Search
CPC ................................................ H04W 72/005
USPC .......................... 370/312, 431, 432, 329, 328
See application file for complete search history.

(56) References Cited

U.S. PATENT DOCUMENTS 7,773,556 B2 *  8/2010  Jung et al. ...................... 370/328
8,005,085 B2 *  8/2011  Bakker et al. .................. 370/390
(Continued)

FOREIGN PATENT DOCUMENTS

CN  101031062 A  9/2007
CN  101132545 A  2/2008
(Continued)

OTHER PUBLICATIONS $1^{st}$ Office Action in corresponding Chinese Patent Application No. 201010195891.2 (Apr. 3, 2013).
(Continued)

*Primary Examiner* — Rasheed Gidado
(74) *Attorney, Agent, or Firm* — Leydig, Voit & Mayer, Ltd.

(57) ABSTRACT

The present invention discloses a data transmission method, base station and terminal. The method comprises: transmitting, in every subframe used for transmitting multimedia broadcast multicast service (MBMS), n transport blocks (TBs) to terminals, and transmitting to the terminals the correspondence between the MBMS corresponding to each TB in the subframe and the TB serial number of each TB in the subframe; wherein n is an integer greater than one, a period of time occupies in every subframe by the TBs corresponding to same MBMS is same, and each TB in the subframe corresponds to a unique TB serial number. The present invention can transmit two or more TBs to terminals in every subframe, and the TBs transmitted in the subframe can correspond to different MBMSs, thereby realizing the transmission of TBs corresponding to a plurality of MBMSs in a subframe and improving the spectrum effectiveness of the data transmission.

7 Claims, 5 Drawing Sheets

(51) Int. Cl.
*H04L 12/58* (2006.01)
*H04W 72/04* (2009.01)

(56) References Cited

U.S. PATENT DOCUMENTS

| | | |
|---|---|---|
| 2008/0045228 A1 | 2/2008 | Zhang et al. |
| 2008/0101270 A1* | 5/2008 | Kekki et al. ............ 370/312 |
| 2009/0147717 A1* | 6/2009 | Cai ........................ 370/312 |
| 2010/0103814 A1* | 4/2010 | Chun et al. ............. 370/225 |
| 2010/0115551 A1* | 5/2010 | Ke et al. ................. 725/39 |
| 2010/0182943 A1 | 7/2010 | Centonza et al. |
| 2011/0013576 A1* | 1/2011 | Hsu ........................ 370/329 |
| 2011/0085508 A1* | 4/2011 | Wengerter et al. ..... 370/329 |
| 2011/0090917 A1 | 4/2011 | Cai |

FOREIGN PATENT DOCUMENTS

| | | |
|---|---|---|
| CN | 101262630 A | 9/2008 |
| CN | 101299822 A | 11/2008 |
| CN | 101383987 A | 3/2009 |
| CN | 101699780 A | 4/2010 |
| EP | 2068492 A1 | 6/2009 |
| WO | WO 2008021573 A2 | 2/2008 |

OTHER PUBLICATIONS

Written Opinion of the International Searching Authority in corresponding PCT Patent Application No. PCT/CN2011/074030 (Aug. 25, 2011).

International Search Report in corresponding PCT Patent Application No. PCT/CN2011/074030 (Aug. 25, 2011).

* cited by examiner transmitting n transport blocks to terminals in each subframe used for
transmitting multimedia broadcast multicast service, wherein n is an integer
greater than one, A period of time occupied in each subframe by the transport
blocks corresponding to the same multimedia broadcast multicast service is
same, and each transport block in the subframe corresponds to a unique
transport block serial number — A1 transmitting to the terminals a correspondence between the multimedia
broadcast multicast service corresponding to each transport block in the
subframe and a transport block serial number of each transport block in the
subframe — A2

Fig. 1 obtaining transport blocks to be transmitted — B1 transmitting n transport blocks to terminals in each subframe used for
transmitting multimedia broadcast multicast service, wherein n is an integer
greater than one, a period of time occupied in each subframe by the transport
blocks corresponding to the same multimedia broadcast multicast service is
same, and each transport block in the subframe corresponds to a unique
transport block serial number — B2 obtaining a correspondence between the multimedia broadcast multicast
service corresponding to each transport block and the transport block serial
number of the transport block, and transmitting the correspondence to the
terminals — B3

Fig. 2

DATA TRANSMISSION METHOD, BASE STATION AND TERMINAL

CROSS-REFERENCE TO RELATED APPLICATION

This application is a continuation of International Patent Application No. PCT/CN2011/074030, filed on May 13, 2011, which claims priority to Chinese Patent Application No. 201010195891.2, filed on Jun. 7, 2010, both of which are hereby incorporated by reference in their entireties.

FIELD OF TECHNOLOGY

The present invention relates to data communications, and more particularly, to a data transmission method, a base station and a terminal.

BACKGROUND OF THE INVENTION

Multimedia broadcast multicast service (MBMS) is one of important parts of service developments of the $3^{rd}$ Generation Partner Project. The evolution NodeB (eNB) simultaneously transmits same multimedia data to a plurality of receivers, for instance, a plurality of terminals, in the network. In comparison with single-user transmission, MBMS greatly saves high-frequency resources.

The data transmission method in the prior art mainly includes obtaining transport blocks to be transmitted, and transmitting one transport block to the terminals in each subframe used for transmitting the multimedia broadcast multicast service.

The transport block may be used to carry service data, and can be transmitted via a physical multicast channel (PMCH).

However, the spectrum effectiveness is relatively low while transmitting MBMS data in the state of the prior art.

SUMMARY OF THE INVENTION

The present invention provides a data transmission method, a base station and a terminal.

A data transmission method provided by the embodiments of the present invention comprises transmitting n transport blocks to terminals in each subframe used for transmitting multimedia broadcast multicast service; and transmitting to the terminals a correspondence between the multimedia broadcast multicast service corresponding to each of the transport blocks in the subframe and a transport block serial number of each of the transport blocks in the subframe; wherein n is an integer greater than one, a period of time occupied in each subframe by the transport blocks corresponding to the same multimedia broadcast multicast service is the same, and each of the transport blocks in the subframe corresponds to a unique transport block serial number.

A data transmission method further provided by the embodiments of the present invention comprises obtaining a size of each of the transport blocks included in a subframe used for transmitting multimedia broadcast multicast service; obtaining a correspondence between the multimedia broadcast multicast service and a transport block serial number of each of the transport blocks in the subframe; obtaining the transport block serial number corresponding to a required multimedia broadcast multicast service according to the correspondence; and obtaining the required multimedia broadcast multicast service's data from the transport block corresponding to the transport block serial number according to the size of each of the transport blocks in the subframe.

A base station further provided by the embodiments of the present invention comprises a data transmitting unit configured to transmit n transport blocks to terminals in each subframe used for transmitting multimedia broadcast multicast service, wherein n is an integer greater than one, a period of time occupied in each subframe by the transport blocks corresponding to the same multimedia broadcast multicast service is same, and each of the transport blocks in the subframe corresponds to a unique transport block serial number; and a correspondence transmitting unit configured to transmit to the terminals a correspondence between the multimedia broadcast multicast service corresponding to each of the transport blocks in the subframe and a transport block serial number of each of the transport blocks in the subframe.

A terminal further provided by the embodiments of the present invention comprises a first obtaining unit configured to obtain a size of each of the transport blocks in a subframe used for transmitting multimedia broadcast multicast service; a correspondence obtaining unit configured to obtain a correspondence between the multimedia broadcast multicast service and a transport block serial number of each of the transport blocks in the subframe; a serial number obtaining unit configured to obtain the transport block serial number corresponding to a required multimedia broadcast multicast service according to the correspondence; and a service data obtaining unit configured to obtain the required multimedia broadcast multicast service's data from the transport block corresponding to the transport block serial number according to the size of each of the transport blocks in the subframe.

In the embodiments of the present invention, two or more transport blocks are transmitted to the terminals within the period of time occupied in each subframe, and each of the transport blocks transmitted in a subframe can correspond to different MBMSs, whereby it is possible to transmit transport blocks corresponding to a plurality of MBMSs in one subframe, and to improve the spectrum effectiveness of data transmission.

BRIEF DESCRIPTION OF THE DRAWINGS

In order to more clearly describe the technical solutions of the prior art or the embodiments of the present invention, the drawings to be used in the descriptions of the prior art or the embodiments are briefly introduced as follows. Obviously, the following drawings just illustrate some embodiments of the present invention, and a person skilled in the art can obtain other drawings from these drawings without paying a creative effort.

FIG. 1 is a flowchart illustrating the data transmission method provided by a first embodiment of the present invention;

FIG. 2 is a flowchart illustrating the data transmission method provided by a second embodiment of the present invention;

DETAILED DESCRIPTION OF THE INVENTION

Figure 3:
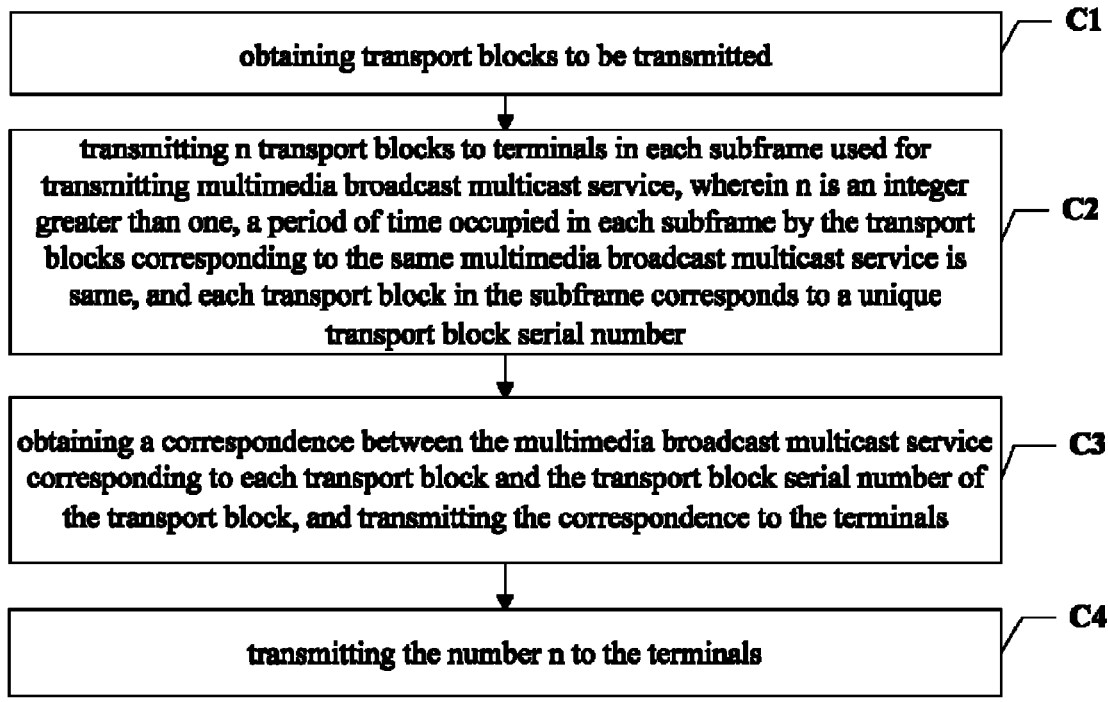
FIG. 3 is a flowchart illustrating the data transmission method provided by a third embodiment of the present invention.

The technical solutions of the embodiments of the present invention will be clearly and completely described as follows in conjunction with the drawings. Apparently, the described embodiments are just a part of embodiments of the present invention rather than all the embodiments. Based on the embodiments of the present invention, any other embodiment obtained by a person skilled in the art without paying a creative effort will fall within the protection scope of the present invention.

The present invention provides data transmission methods, a base station and a terminal. For better comprehension of the technical solutions of the present invention, embodiments provided in the present invention are described in greater detail below with reference to the accompanying drawings.

FIG. 1 is a flowchart illustrating the data transmission method provided by a first embodiment of the present invention.

In the embodiments of the present invention, it is necessary for a base station to transmit service data of a plurality of MBMSs to terminals. The data transmission method provided by the first embodiment of the present invention mainly includes the following steps.

A1. Transmitting, in each subframe used for transmitting multimedia broadcast multicast service, n transport blocks to terminals, wherein n is an integer greater than one, a period of time occupied in each subframe by the transport blocks corresponding to the same multimedia broadcast multicast service is same, and each transport block in the subframe corresponds to a unique transport block serial number.

Specifically, the base station can obtain transport blocks to be transmitted to terminals, and then transmit, in each subframe used for transmitting multimedia broadcast multicast service, n transport blocks to the terminals, wherein n is an integer greater than one. A period of time occupied in each subframe by the transport blocks corresponding to the same multimedia broadcast multicast service is same, and each transport block in the subframe corresponds to a unique transport block serial number.

The transport blocks carry therewith the service data of MBMSs to be transmitted. The base station can obtain the transport blocks either from the base station itself or from other network elements.

A2. Transmitting a correspondence between the multimedia broadcast multicast service corresponding to each transport block in the subframe and a transport block serial number of each transport block in the subframe to the terminals.

Specifically, the base station can transmit a correspondence between the multimedia broadcast multicast service corresponding to each transport block in the subframe and a transport block serial number of each transport block in the subframe to the terminals. As should be explained, the execution sequence from A1 to A2 is not inevitable, and the sequence of transmitting the transport blocks and then the correspondence does not restrict the embodiments of the present invention.

In the embodiments of the present invention, two or more transport blocks are transmitted to the terminals within the period of time occupied in each subframe, and transport blocks transmitted in a subframe can correspond to different MBMSs, whereby it is possible to transmit transport blocks corresponding to a plurality of MBMSs in one subframe, and to improve the spectrum effectiveness of data transmission.

FIG. 2 is a flowchart illustrating the data transmission method provided by the second embodiment of the present invention.

In the embodiments of the present invention, it is necessary for the base station to transmit the service data of a plurality of MBMSs to the terminals. The data transmission method provided by the second embodiment of the present invention mainly includes the following steps.

B1. Obtaining transport blocks to be transmitted.

Specifically, the base station obtains transport blocks to be transmitted, the transport blocks can respectively correspond to different multimedia broadcast multicast services, and the different multimedia broadcast multicast services can correspond to different service serial numbers. The transport blocks carry therewith the service data of MBMSs to be transmitted. The base station can obtain the transport blocks either from the base station itself or from other network elements.

B2. Transmitting, in each subframe used for transmitting multimedia broadcast multicast service, n transport blocks to terminals, wherein n is an integer greater than one, a period of time occupied in each subframe by the transport blocks corresponding to the same multimedia broadcast multicast service is same, and each transport block in the subframe corresponds to a unique transport block serial number.

Specifically, the base station can transmit, in each subframe used for transmitting multimedia broadcast multicast service, n transport blocks to the terminals, and n is an integer greater than one. In the embodiments of the present invention, a plurality of transport blocks transmitted in the subframe respectively correspond to different multimedia broadcast multicast services. When the base station transmits the transport blocks, a period of time occupied in each subframe by the transport blocks corresponding to the same multimedia broadcast multicast service is same. Further, a transport block corresponds to a transport block serial number, and each transport block in the subframe corresponds to a unique transport block serial number.

B3. Obtaining a correspondence between the multimedia broadcast multicast service corresponding to each transport block and the transport block serial number of the transport block, and transmitting the correspondence to the terminals.

Specifically, the base station can obtain a correspondence between the multimedia broadcast multicast service corresponding to each transport block and the transport block serial number of the transport block while transmitting transport blocks corresponding to different multimedia broadcast multicast services, and then transmit the correspondence to the terminals via radio resource control (RRC) layer signaling or a media access control cell.

Optionally, the sequence of obtaining the correspondence and obtaining the transport blocks are not limited to the sequence disclosed in the embodiments of the present invention, thus the sequence of step B3, steps B1 and B2 are not limited thereto. For instance, the base station may receive a message transmitted from another network element to obtain the aforementioned correspondence prior to transmitting the transport blocks, and then transmit the obtained correspondence to the terminals. The base station may as well first obtain the transport blocks to be transmitted, transmit the transport blocks in the subframe, and then obtain and transmit the aforementioned correspondence after transmission of the transport blocks is complete.

In the embodiments of the present invention, two or more transport blocks are transmitted to the terminals per the period of time occupied in each subframe, and the plurality of transport blocks transmitted in a subframe respectively correspond to different MBMSs, whereby it is possible to transmit transport blocks corresponding to a plurality of MBMSs in one subframe, and to improve the spectrum effectiveness of data transmission.

In the embodiments of the present invention, the RRC layer signaling may be an MBMS control channel (MCCH) message or system information block type 13 (SIB13) message.

For instance, after obtaining the aforementioned correspondence, the base station can transmit MCCH message, which carries therewith the correspondence, to the terminals. In comparison with the prior art, a field indicative of the transport block serial number is added to the MCCH message in this embodiment, for instance, this field is an integer variable transport block index or code in IE of TMGI, and the value of which is an integer in a range from 1 to 6.

The media access control cell may be multicast channel scheduling information (MSI) or other information. The base station can transmit the multicast channel scheduling information, which carries therewith the correspondence, to the terminals. For instance, the format of the multicast channel scheduling information can be as shown in the following Table 1.

TABLE 1

| LCID1 | Stop MTCH1 |
|---|---|
| Stop MTCH1 | |
| Transport Block Serial Number (MTCH1) | |
| LCID2 | Stop MTCH2 |
| Stop MTCH2 | |
| Transport Block Serial Number (MTCH2) | |
| . . . | |
| LCID n | Stop MTCH n |
| Stop MTCH n | |
| Transport Block Serial Number (MTCH n) | |

In Table 1, the field of transport block serial number is a newly added field, and MTCHn is used to differentiate different MBMSs. The field of LCID represents a logical channel identifier, and the field of Stop MTCH has 11 bits in total, representing the termination subframe of MTCH inside MCH subframe allocation pattern (MSAP) occasion.

The terminal can obtain the transport block serial number corresponding to the multimedia broadcast multicast service to be received according to the correspondence, then query a preset correspondence among a system bandwidth, the number n of transport blocks included in the subframe and the number of resource blocks in each transport block, obtain the number n of transport blocks included in the subframe used for transmitting multimedia broadcast multicast service and corresponding to the current system bandwidth as well as the number of resource blocks in each transport block, then obtain the size of each transport block according to the number of resource blocks in each transport block, and finally obtain MBMS's data from the transport block corresponding to the transport block serial number according to the number n of transport blocks in the subframe and the size of each transport block.

FIG. 3 is a flowchart illustrating the data transmission method provided by the third embodiment of the present invention.

The data transmission method provided by the third embodiment of the present invention includes the following steps.

C1. Obtaining transport blocks to be transmitted.

C2. Transmitting, in each subframe used for transmitting multimedia broadcast multicast service, n transport blocks to terminals, wherein n is an integer greater than one, a period of time occupied in each subframe by the transport blocks corresponding to the same multimedia broadcast multicast service is same, and each transport block in the subframe corresponds to a unique transport block serial number.

C3. Obtaining a correspondence between the multimedia broadcast multicast service corresponding to each transport block and the transport block serial number of the transport block, and transmitting the correspondence to the terminals.

The execution of steps C1-C3 is similar to that of steps B1-B3 in the aforementioned data transmission method in the second embodiment, and is hence not repetitively described in this context.

C4. Transmitting said n to the terminals.

Specifically, said n can be transmitted to the terminals via RRC layer signaling in the embodiments of the present invention. The RRC layer signaling may be an SIB13 message or an MCCH message.

The sequence of steps C2, C4 and C3 are not limited by the embodiment of the present invention. The base station can simultaneously transmit the transport blocks, said n and the correspondence to the terminals, and the specific transmitting sequence thereof does not restrict the embodiments of the present invention.

The terminal can obtain the transport block serial number corresponding to the multimedia broadcast multicast service to be received according to the correspondence, then calculate to obtain the number of resource blocks included in each transport block in the subframe, further obtain the size of each transport block according to the number of resource blocks in each transport block, and finally obtain MBMS's data from the transport block corresponding to the transport block serial number according to the number n of transport blocks in the subframe and the size of each transport block.

In the embodiments of the present invention, two or more data blocks are transmitted in one subframe, and a plurality of transport blocks transmitted in a subframe respectively correspond to different MBMSs. In comparison with the prior art, embodiments of the present invention can correspondingly increase the service data transmitted in one subframe, whereby spectrum effectiveness is improved during transmission of MBMS's data.

Figure 4:
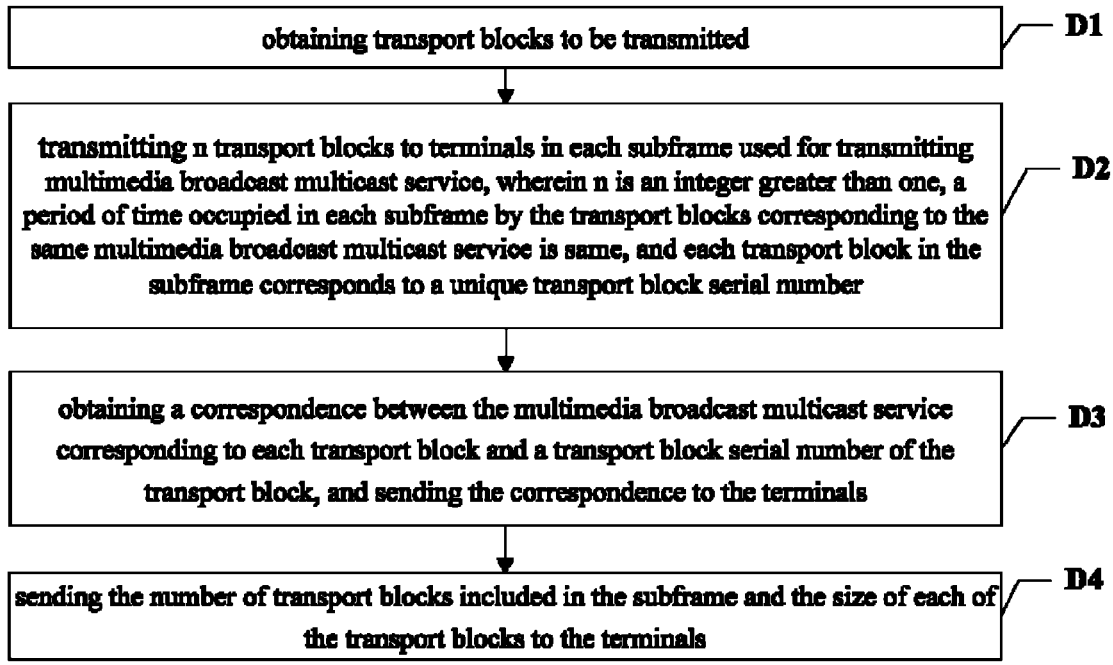
FIG. 4 is a flowchart illustrating the data transmission method provided by a fourth embodiment of the present invention.

FIG. 4 is a flowchart illustrating the data transmission method provided by the fourth embodiment of the present invention.

The data transmission method provided by the fourth embodiment of the present invention includes the following steps.

D1. Obtaining transport blocks to be transmitted, and the number of transport blocks and the size of each transport block included in a subframe used for transmitting multimedia broadcast multicast service.

Specifically, the base station obtains transport blocks to be transmitted, and the number of transport blocks and the size of each transport block included in a subframe used for transmitting multimedia broadcast multicast service.

D2. Transmitting, in each subframe used for transmitting multimedia broadcast multicast service, n transport blocks to terminals, wherein n is an integer greater than one, a period of time occupied in each subframe by the transport blocks corresponding to the same multimedia broadcast multicast service is same, and each transport block in the subframe corresponds to a unique transport block serial number.

D3. Obtaining a correspondence between the multimedia broadcast multicast service corresponding to each transport block and a transport block serial number of the transport block, and transmitting the correspondence to the terminals.

The execution of steps D2-D3 is identical to that of steps B2-B3 in the aforementioned data transmission method in the first embodiment, and is hence not repetitively described in this context.

D4. Transmitting the number of transport blocks and the size of each transport block included in the subframe to the terminals.

Specifically, the number of transport blocks and the size of each transport block included in the subframe can be transmitted to the terminals via RRC layer signaling in the embodiments of the present invention. The RRC layer signaling may be an SIB13 message or an MCCH message.

The sequence of steps D4, D3 and D2 are not limited by the embodiment of the present invention. The base station can simultaneously transmit the transport blocks, said n, the size of each transport block and the correspondence to the terminals, and the specific transmitting sequence thereof does not restrict the embodiments of the present invention.

The terminal can obtain the transport block serial number corresponding to the multimedia broadcast multicast service to be received according to the correspondence, and then obtain MBMS's data from the transport block corresponding to the transport block serial number according to the number n of transport blocks in the subframe and the size of each transport block.

In the embodiments of the present invention, two or more data blocks are transmitted in one subframe, and a plurality of transport blocks transmitted in a subframe respectively correspond to different MBMSs. In comparison with the prior art, embodiments of the present invention can correspondingly increase the service data transmitted in one subframe, whereby spectrum effectiveness is improved during transmission of MBMS's service data.

Figure 5:
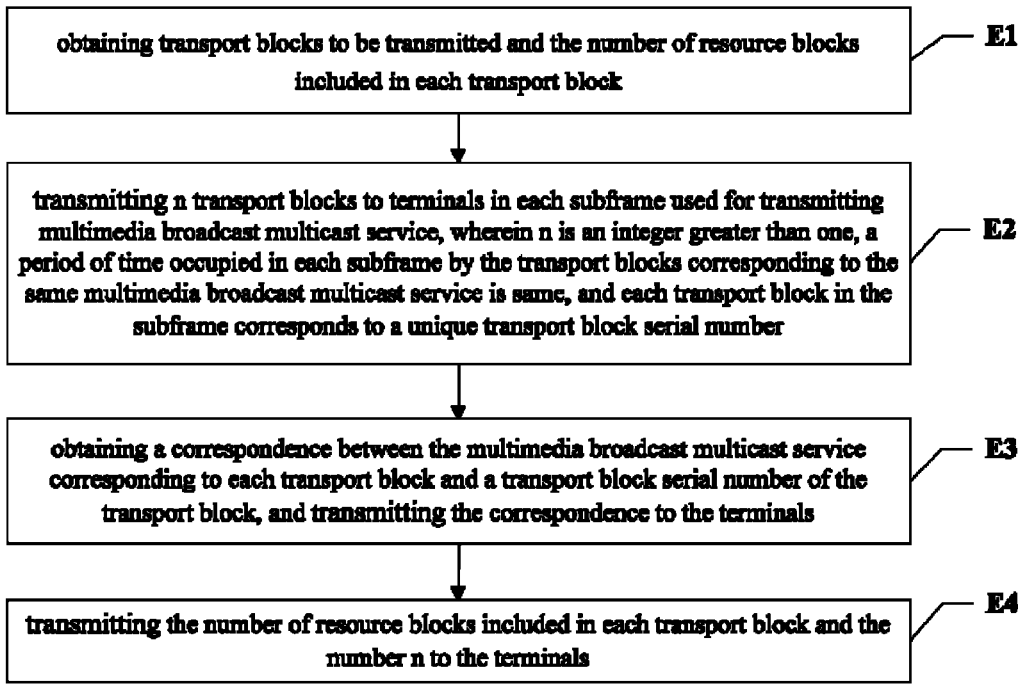
FIG. 5 is a flowchart illustrating the data transmission method provided by a fifth embodiment of the present invention.

FIG. 5 is a flowchart illustrating the data transmission method provided by the fifth embodiment of the present invention.

The data transmission method provided by the embodiment of the present invention includes the following steps.

E1. Obtaining transport blocks to be transmitted, and the number of resource blocks included in each transport block.

Specifically, the base station can obtain transport blocks to be transmitted, and the number of resource blocks included in each transport block. The number of resource blocks included in each transport block can be decided by physical layer characteristics of the base station. For instance, the system bandwidth is 20 MHz, and the number of resource blocks (RBs) included in each transport block can be 15.

The base station may obtain the transport blocks and the number of resource blocks included in the transport blocks from the base station itself, for instance, from configuration information of Operation And Management (OAM) of the base station. The base station may also obtain the transport blocks and the number of resource blocks included in the transport blocks from another network elements, such as a multi-cell/multicast coordination entity (MCE).

E2. Transmitting, in each subframe used for transmitting multimedia broadcast multicast service, n transport blocks to terminals, wherein n is an integer greater than one, a period of time occupied in each subframe by the transport blocks corresponding to the same multimedia broadcast multicast service is same, and each transport block in the subframe corresponds to a unique transport block serial number.

E3. Obtaining a correspondence between the multimedia broadcast multicast service corresponding to each transport block and a transport block serial number of the transport block, and transmitting the correspondence to the terminals.

The execution of steps E2-E3 is identical to that of steps C2-C3 in the aforementioned data transmission method in the second embodiment, and is hence not repetitively described in this context.

E4. Transmitting the number of resource blocks included in each transport block and said n to the terminals.

Specifically, the base station can transmit the number of resource blocks included in each transport block and said n to the terminals via RRC layer signaling. The RRC layer signaling may be an SIB13 message or an MCCH message.

As should be pointed out, the sequence of steps E2, E3 and E4 is not limited by the embodiment of present invention. The base station can simultaneously transmit the transport blocks, said n, the number of resource blocks included in each transport block and the correspondence to the terminals, and the specific transmitting sequence thereof does not restrict the embodiments of the present invention.

The terminal can obtain the transport block serial number corresponding to the multimedia broadcast multicast service to be received according to the correspondence, then obtain the size of each transport block in the subframe according to the number of resource blocks included in each transport block, and obtain MBMS's data from the transport block corresponding to the transport block serial number according to the number n of transport blocks in the subframe and the size of each transport block.

In the embodiments of the present invention, two or more data blocks are transmitted in one subframe, and a plurality of transport blocks transmitted in a subframe respectively correspond to different MBMSs. In comparison with the prior art, embodiments of the present invention can correspondingly increase the service data transmitted in one subframe, whereby spectrum effectiveness is improved during transmission of MBMS's service data.

Figure 6:
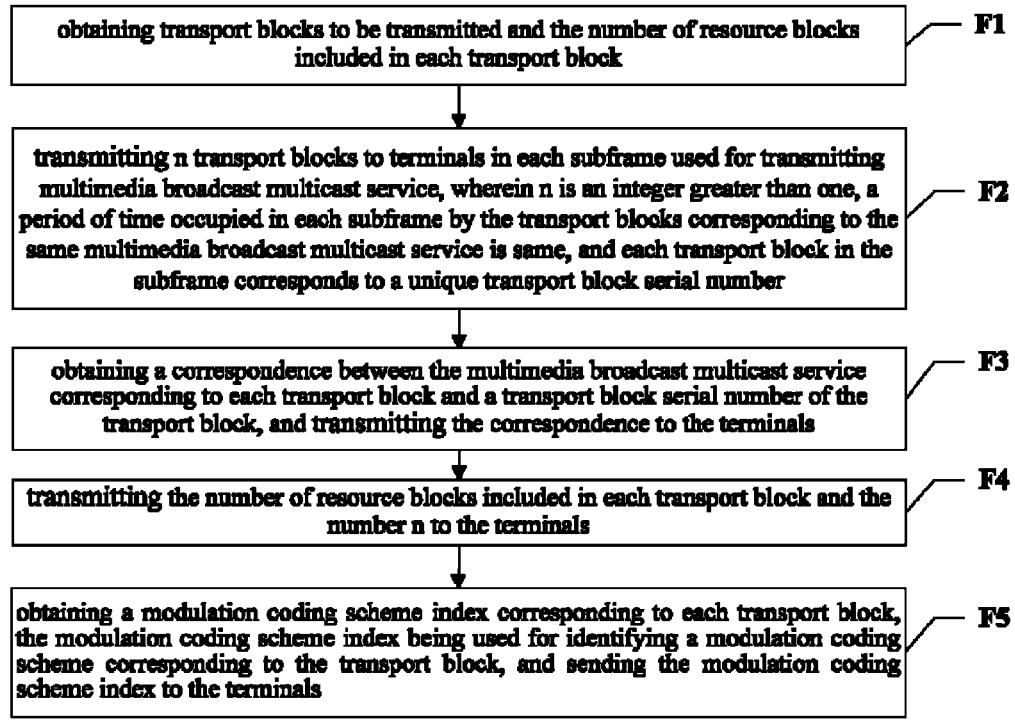
FIG. 6 is a flowchart illustrating the data transmission method provided by a sixth embodiment of the present invention.

FIG. 6 is a flowchart illustrating the data transmission method provided by the sixth embodiment of the present invention.

The data transmission method provided by the sixth embodiment of the present invention includes the following steps.

F1. Obtaining transport blocks to be transmitted and the number of resource blocks included in each transport block.

F2. Transmitting, in each subframe used for transmitting multimedia broadcast multicast service, n transport blocks to terminals, wherein n is an integer greater than one, a period of time occupied in each subframe by the transport blocks corresponding to the same multimedia broadcast multicast service is same, and each transport block in the subframe corresponds to a unique transport block serial number.

F3. Obtaining a correspondence between the multimedia broadcast multicast service corresponding to each transport block and a transport block serial number of the transport block, and transmitting the correspondence to the terminals.

F4. Transmitting the number of resource blocks included in each transport block and said n to the terminals.

The execution of steps F1-F4 is identical to that of steps E1-E4 in the aforementioned data transmission method in the fourth embodiment, and is hence not repetitively described in this context.

F5. Obtaining a modulation coding scheme index corresponding to each transport block, the modulation coding scheme index being used for identifying a modulation coding scheme corresponding to the transport block, and transmitting the modulation coding scheme index to the terminals.

Specifically, in the embodiment of the present invention, the resource blocks in the transport blocks are different in size from the others, the base station can obtain the modulation coding scheme index (MCS Index, $I_{MCS}$) of each transport block, the modulation coding scheme index is used for identifying the modulation coding scheme corresponding to the transport block, and the base station can transmit the modulation coding scheme index to the terminals via RRC layer signaling.

The modulation coding scheme corresponding to each transport block can be decided by the physical layer characteristics of the base station, and the base station can obtain the modulation coding scheme index corresponding to each transport block according to the physical layer characteristics of the base station. The RRC layer signaling may be an SIB13 message or an MCCH message.

As should be explained, the sequence of steps F5, F4, F3 and F2 is not limited by the embodiment of the present invention. The base station can simultaneously said n, the number of resource blocks included in each transport block, the modulation coding scheme index of each transport block and the correspondence to the terminals, and the specific transmitting sequence thereof does not restrict the embodiments of the present invention.

After obtaining the number of resource blocks included in each transport block and the modulation coding scheme index of the transport block, the terminal searches for a preset correspondence according to the number of resource blocks included in each transport block and the modulation coding scheme index, so as to obtain the size of the corresponding transport block. The terminal can obtain the transport block serial number corresponding to the multimedia broadcast multicast service to be received according to the correspondence, and then obtain MBMS's data from the transport block corresponding to the transport block serial number according to the number n of transport blocks in the subframe and the size of each transport block.

In the embodiment of the present invention, two or more data blocks are transmitted in one subframe, and a plurality of transport blocks transmitted in a subframe respectively correspond to different MBMSs. In comparison with the prior art, the embodiment of the present invention can correspondingly increase the service data transmitted in one subframe, whereby spectrum effectiveness is improved during transmission of MBMS service data. The embodiment of the present invention can also simultaneously transmit the service data of a plurality of MBMSs to the terminals, and are capable of adapting to more application scenarios. In addition, the embodiment of the present invention can also be used in an application scenario where the resource blocks included in a transport block are different in size.

In the data transmission methods provided by the fourth to sixth embodiments of the present invention, the base station may not transmit said n to the terminals.

In the data transmission methods provided by the first to sixth embodiments of the present invention, obtaining transport blocks by the base station may include receiving, by the base station, transport blocks from a core network or other devices, alternatively, the transport blocks may be generated by the base station generating itself.

In the data transmission methods provided by the first to sixth embodiments of the present invention, one piece or more pieces of the scheduling information, such as the number n of transport blocks in a subframe used for transmitting MBMS, the number of resource blocks included in each transport block, the correspondence between the multimedia broadcast multicast service corresponding to the transport block or the multimedia broadcast multicast service and the transport block serial number of the transport block corresponding to the multimedia broadcast multicast service, and the modulation coding scheme index of the transport block, as obtained by the base station may come from the MCE, for instance, a multimedia broadcast multicast service (MBMS) scheduling message or other currently existing messages or newly defined messages transmitted by the MCE. One piece or more pieces of the aforementioned information obtained by the base station may also be generated or configured by the base station itself.

Optionally, the information obtained by the base station can be transmitted to the terminals via one or more messages, there is no inevitable sequence for the base station to transmit the information, and there is also no inevitable sequence with respect to the transmission of the transport blocks.

For instance, the MBMS scheduling message carries therewith one or more kinds of the following scheduling information:

1) the number of transport blocks transmitted by each subframe;

2) the number of resource blocks included in each transport block;

3) a modulation coding scheme index corresponding to each transport block; and 4) a correspondence between the multimedia broadcast multicast service to be transmitted and a transport block serial number of the transport block corresponding to the multimedia broadcast multicast service.

The MBMS gateway at the network side can transmit the coordination scheduling information to a mobility management entity (MME) by using an existing message or a newly defined message, the MME makes use of an existing message or a newly defined message to transmit these information to the MCE, and the MCE thereafter makes use of an existing message, such as the MBMS scheduling message, or a newly defined message to transmit these scheduling information to eNB. Embodiments of the present invention ensure the synchronous transmission of the same MBMS within the entire MBMS multi-cell synchronous transmission region.

Data transmission methods provided by embodiments of the present invention are described above from the perspective of the base station, while a data transmission method provided by an embodiment of the present invention is described below from the perspective of the terminal.

Figure 7:
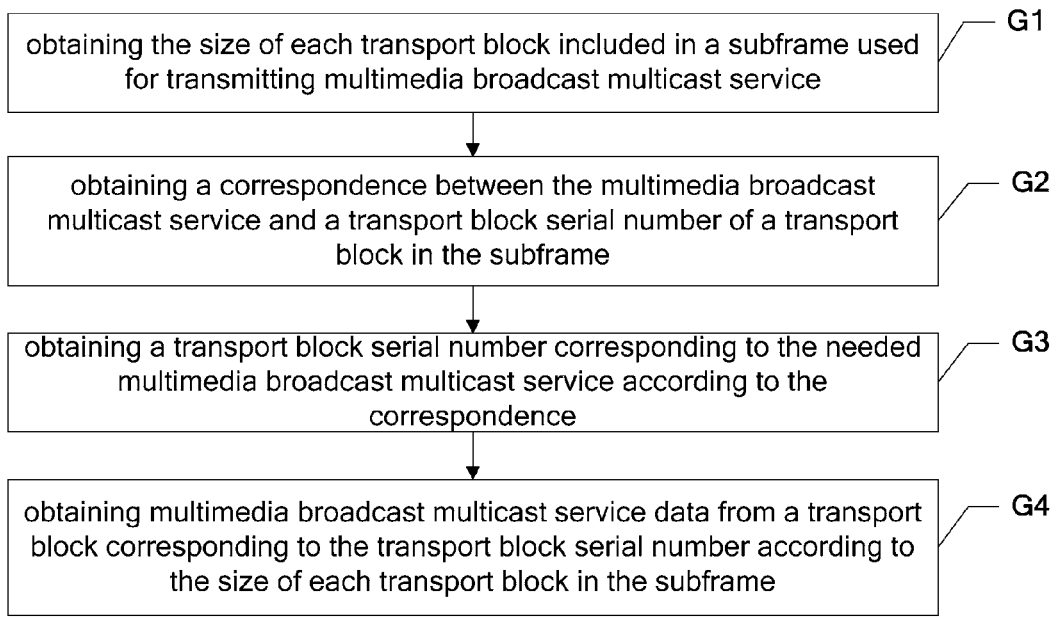
FIG. 7 is a flowchart illustrating the data transmission method provided by a seventh embodiment of the present invention.

FIG. 7 is a flowchart illustrating the data transmission method provided by the seventh embodiment of the present invention.

The data transmission method provided by the seventh embodiment of the present invention mainly includes the following steps.

G1. Obtaining the size of each transport block included in a subframe used for transmitting multimedia broadcast multicast service.

Specifically, the terminal can obtain the size of each transport block included in a subframe used for transmitting multimedia broadcast multicast service.

G2. Obtaining a correspondence between the multimedia broadcast multicast service and a transport block serial number of a transport block in the subframe.

Specifically, the terminal can obtain the correspondence between the multimedia broadcast multicast service and a transport block serial number of a transport block in the subframe used for transmitting multimedia broadcast multicast service.

The terminal can receive a message, such as an SIB13 or MCCH message in RRC layer signaling, transmitted from the base station, the message carrying therewith the correspondence. The terminal can also receive an MCH scheduling message or other messages in a media access control cell transmitted from the base station, the MCH scheduling message carrying therewith the correspondence.

G3. Obtaining a transport block serial number corresponding to the required multimedia broadcast multicast service according to the correspondence.

Specifically, the terminal can freely select the MBMS data to be received, so the terminal obtains the transport block serial number corresponding to the multimedia broadcast multicast service to be received according to the correspondence.

G4. Obtaining multimedia broadcast multicast's service data from a transport block corresponding to the transport block serial number according to the size of each transport block in the subframe.

Specifically, after obtaining the transport block serial number corresponding to the MBMS to be received, the terminal can obtain MBMS data from a transport block corresponding to the transport block serial number according to the size of each transport block.

For instance, transport blocks in the subframe each have a size of 17 RB, 16 RB and 17 RB, respectively, and the transport block serial number is 3, thus the terminal reads, from data transmitted from the network side, the MBMS data carried in the transport block whose serial number is 3 and whose size is 17 RB.

In the data transmission method provided by the seventh embodiment of the present invention, two or more transport blocks are included in the data in one frame received by the terminal, and the terminal obtains service data from the received transport blocks according to the number of transport blocks and the size of each transport block received in one frame. In comparison with the prior art, the service data received by the terminal within the time of one frame is increased, thereby improving spectrum effectiveness of data transmission.

In the data transmission method provided by the seventh embodiment of the present invention, the following modes can be employed for the terminal to obtain the size of each transport block in the subframe.

1) The terminal can query a preset correspondence between system bandwidths and the number of resource blocks included in each transport block according to the current system bandwidth, so as to obtain the number of resource blocks included in each transport block in a subframe used for transmitting MBMS, and then obtain the size of each transport block according to the number of resource blocks included in each transport block.

The terminal can also query a preset correspondence between system bandwidths and the number of transport blocks in a subframe used for transmitting MBMS according to the current system bandwidth, so as to obtain the number n of transport blocks included in the subframe used for transmitting MBMS. The terminal obtains the required multimedia broadcast multicast service from the transport block corresponding to the transport block serial number according to said n and the size of each transport block in the subframe.

In this case, it is not necessary for the base station to transmit said n and the number of resource blocks included in the transport blocks to the terminal via a message.

Embodiments of the present invention make it possible to consolidate the corresponding number of transport blocks and the corresponding number of resource blocks included in each transport block under each system bandwidth through the mode of hardware coding at the media access sublayer or the physical layer, namely to consolidate the aforementioned correspondences.

For instance, to achieve the spectrum effectiveness of 3 b/s/Hz (with 0.5 b/s/Hz as a reference):

20 MHz bandwidth: corresponding to 100 resource blocks (RBs) and 6 transport blocks, of which 5 transport blocks each occupy 17 RBs, and the other transport block occupies 15 RBs.

10 MHz bandwidth: corresponding to 50 RBs and 3 transport blocks, of which 2 transport blocks each occupy 17 RBs, and the other transport block occupies 16 RBs.

5 MH bandwidth: corresponding to 25 RBs and 2 transport blocks, of which one transport block occupies 13 RBs, and the other transport block occupies 12 RBs.

less than 5 MH bandwidth: corresponding to one transport block.

2) The terminal receives from the base station a message such as a system information block type 13 or MCCH message in RRC layer signaling, the message carrying therewith the number n of transport blocks included in the subframe used for transmitting MBMS and the size of each transport block.

The terminal receives a message carrying therewith said n and the size of each transport block, and obtains the number n of transport blocks and the size of each transport block included in each subframe used for transmitting MBMS.

3) The terminal receives from the base station a message such as a system information block type 13 or MCCH message in RRC layer signaling, the message carrying therewith the number n of transport blocks included in each subframe used for transmitting MBMS, and calculates to obtain the size of each transport block in the subframe.

In the embodiments of the present invention, the terminal can obtain the number n of transport blocks included in the subframe according to the received message, and then calculate to obtain the number of resource blocks included in each transport block.

For instance, the index of $RB_{start}^0$, of the first RB of the first transport block (TB) has a value zero, and the index of the first RB of the $i^{th}$ TB is obtained by calculation—an optional equation is as follows:

$$RB_{start}^i = \begin{cases} RB_{start}^{i-1} + \text{floor}\left(\frac{N_{RB}^{DL}}{N_{TB}}\right) + 1, & \text{if } 0 < i \leq (N_{RB}^{DL} \bmod N_{TB}) \\ RB_{start}^{i-1} + \text{floor}\left(\frac{N_{RB}^{DL}}{N_{TB}}\right), & \text{if } (N_{RB}^{DL} \bmod N_{TB}) < i < N_{TB} \end{cases}$$

where FLOOR performs a rounding down, mod indicates finding remainder, $N_{TB}$ indicates the number of transport blocks transmitted in a subframe used for transmitting MBMS, and $N_{RB}^{DL}$ indicates the total number of resource blocks in a subframe used for transmitting MBMS. The terminal subtracts the index of the first resource block of a previous transport block from the index of the first resource block of a subsequent transport block to obtain the number of resource blocks included in each transport block, and then obtains the size of each transport block according to the number of resource blocks included in each transport block.

For instance, if the number of resource blocks in one frame corresponding to the current system bandwidth is 100, and if there are 6 transport blocks transmitted in the subframe, it is possible for the terminal to first calculate to obtain the index of the first RB of each transport block, respectively, which are 0, 17, 34, 51, 68, 84, and then further calculate to obtain the number of RBs included in each transport block, which are 17, 17, 17, 17, 16, 16.

The sizes of the resource blocks are identical, and the terminal can simply obtain the size of each transport block according to the number of resource blocks included in the transport blocks and the size of each resource block.

4) The terminal receives from the base station a message such as a system information block type 13 or MCCH message in RRC layer signaling, the message carrying therewith the number n of transport blocks included in each subframe used for transmitting MBMS, and then calculates to obtain the size of each transport block in the subframe.

Specifically, the terminal can query a preset correspondence according to the modulation coding scheme index obtained from the received message and the number of resource blocks included in each transport block obtained by calculation to obtain the size of each transport block.

The method for calculating to obtain the number of resource blocks included in each transport block is the same as described in the above 3), and is hence not repetitively described in this context.

5) The terminal receives from the base station a message such as a system information block type 13 or MCCH message in RRC layer signaling, the message carrying therewith the number n of transport blocks included in each subframe used for transmitting MBMS and the number of resource blocks included in each transport block, and then obtains the size of each transport block according to the number of resource blocks included in the transport blocks.

Specifically, the terminal can obtain the number n of transport blocks included in each subframe used for transmitting MBMS and the number of resource blocks included in each transport block according to the received message, and the terminal can simply obtain the size of each transport block according to the number of resource blocks included in the transport blocks and the size of each resource block.

6) The terminal receives from the base station a message such as a system information block type 13 or MCCH message in RRC layer signaling, the message carrying therewith the number n of transport blocks included in a subframe used for transmitting MBMS, the number of resource blocks included in the transport block and the modulation coding scheme index corresponding to the transport block, and then obtains the size of each transport block according to the number of resource blocks included in the transport block and the modulation coding scheme index corresponding to the transport block.

Specifically, the terminal can obtain the number n of transport blocks included in the subframe, the number of resource blocks included in each transport block and the modulation coding scheme index corresponding to the transport block from the received message, and then obtain the size of each transport block by querying a preset correspondence according to the number of RBs included in each transport block and the modulation coding scheme index.

In the data transmission methods provided by the embodiments of the present invention, the terminal may not obtain the number n of the transport blocks; the message received by the terminal may not include the number n of transport blocks in the subframe; and instead of obtaining multimedia broadcast multicast service according to the number n of transport blocks in the subframe, the terminal may obtain the multimedia broadcast multicast's service data from the transport block corresponding to the transport block serial number according to the size of the transport block.

In the embodiments of the present invention, the terminal can receive two or more transport blocks in one subframe, and a plurality of transport blocks transmitted in one subframe respectively correspond to different MBMSs. Embodiments of the present invention make it possible to transmit transport blocks corresponding to a plurality of MBMSs in one subframe, whereby it is not only possible to improve spectrum effectiveness of data transmission, but also enable the terminal to simultaneously receive service data of a plurality of MBMSs, and to adapt to more application scenarios.

As should be pointed out, there are two circumstances in which the terminal obtains the size of each transport block in a subframe according to the embodiments of the present invention:

a. resource blocks in each transport block have identical size.

The terminal obtains the number of resource blocks included in the transport block, and then obtains the size of the transport block by multiplying the number of the included resource blocks with the size of the resource blocks, for examples, this mode of obtaining the size of each transport block in a subframe is as shown in the aforementioned 1), 3), 4) and 5).

b. resource blocks in each transport block have different sizes.

After obtaining the number of resource blocks included in the transport block, the terminal obtain the modulation coding scheme index of each transport block. In this case, the base station can transmit RRC layer signaling carrying therewith the modulation coding scheme index of each transport block to the terminal, and the terminal obtains the modulation coding scheme index according to the received signaling, and then obtains the size of each transport block by querying a preset correspondence according to the number of resource blocks included in the transport block and the modulation coding scheme index. For examples, this mode of obtaining the size of each transport block in a subframe is as shown in the aforementioned mode 2). As should be pointed out, the process of obtaining the size of the transport block provided by mode 2) can also be used in the aforementioned modes 1), 3), 4) and 5).

Data transmission methods provided by embodiments of the present invention are described in detail above, while devices corresponding to the method embodiments of the present invention are described below.

Figure 8:
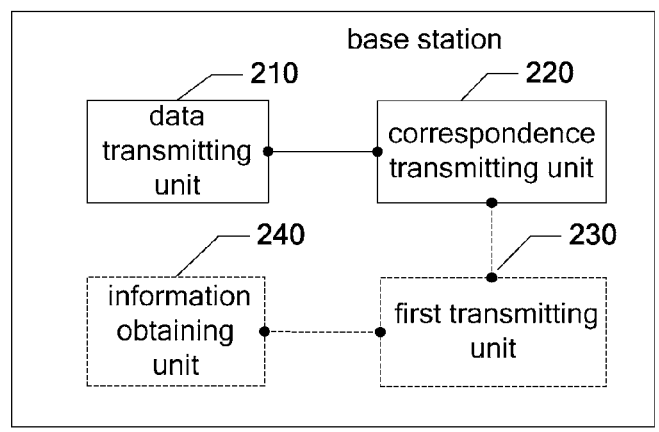
FIG. 8 is a schematic diagram illustrating the structure of the base station provided by an eighth embodiment of the present invention.

FIG. 8 is a schematic diagram illustrating the structure of the base station provided by the eighth embodiment of the present invention.

The base station provided by the eighth embodiment of the present invention includes a data transmitting unit 210 configured to transmit n transport blocks to terminals in each subframe used for transmitting multimedia broadcast multicast service, where n is an integer greater than one, a period of time occupied in each subframe by the transport blocks corresponding to the same multimedia broadcast multicast service is same, and each transport block in the subframe corresponds to a unique transport block serial number; and a correspondence transmitting unit 220 configured to transmit to the terminals a correspondence between the multimedia broadcast multicast service corresponding to each transport block in the subframe and a transport block serial number of each transport block in the subframe.

The base station provided in this embodiment of the present invention can be used in the corresponding data transmission method of the first embodiment—see the aforementioned method embodiment for the detailed process of data transmission.

Moreover, the base station according to the seventh embodiment of the present invention may further include a first transmitting unit 230 configured to transmit to the terminals one or more of information selected from said n, the size of each transport block in the subframe, the number of resource blocks included in each transport block in the subframe, and the modulation coding scheme index corresponding to the transport block, wherein the modulation coding scheme index is used for identifying a modulation coding scheme corresponding to the transport block.

With the addition of the first transmitting unit 230, embodiments of the present invention enable the base station to transmit such information as the number of transport blocks included in the subframe used for transmitting MBMS, the size of each transport block, or the modulation coding scheme index of each transport block to the terminals. The base station according to this embodiment can be used in the corresponding data transmission methods in the aforementioned second to sixth embodiments—see the aforementioned method embodiments for the detailed process of data transmission.

Furthermore, the base station according to the embodiment may further include an information obtaining unit 240 configured to obtain, from an MCE, the information to be transmitted to the terminals, or to generate or configure the information to be transmitted to the terminals.

Figure 9:
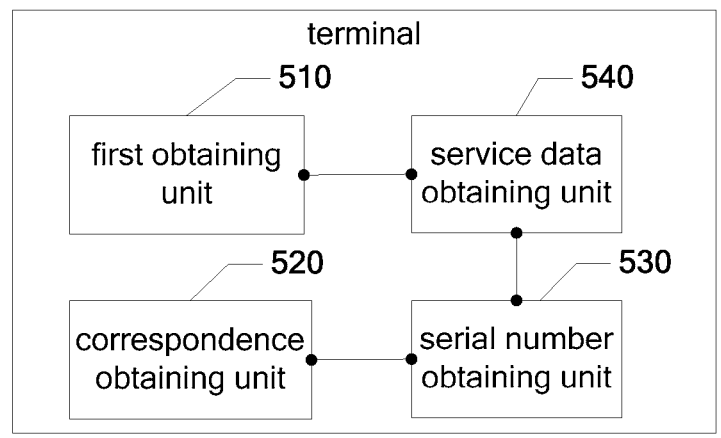
FIG. 9 is a schematic diagram illustrating the structure of the terminal provided by a ninth embodiment of the present invention.

FIG. 9 is a schematic diagram illustrating the structure of the terminal provided by the ninth embodiment of the present invention.

The terminal provided by the ninth embodiment of the present invention mainly includes a first obtaining unit 510 configured to obtain the size of each transport block in a subframe used for transmitting multimedia broadcast multicast service; a correspondence obtaining unit 520 configured to obtain a correspondence between the multimedia broadcast multicast service and a transport block serial number of each transport block in the subframe; a serial number obtaining unit 530 configured to obtain a transport block serial number corresponding to needed multimedia broadcast multicast service according to the correspondence; and a service data obtaining unit 540 configured to obtain needed multimedia broadcast multicast's service data from the transport block corresponding to the transport block serial number according to the size of each transport block in the subframe.

The terminal according to the ninth embodiment of the present invention can be used in the corresponding data transmission method in the aforementioned fifth embodiment—see the method embodiment for the detailed process of data transmission. The first obtaining unit 510 can also be used to obtain the number n of transport blocks included in the subframe used for transmitting multimedia broadcast multicast service, and the service data obtaining unit 540 can also be used to obtain needed multimedia broadcast multicast's service data from the transport block corresponding to the transport block serial number according to the number n of the transport blocks and the size of each transport block in the subframe.

Moreover, the correspondence obtaining unit 520 in the terminal according to the ninth embodiment of the present invention can include a message receiving module 521 configured to receive RRC layer signaling or a media access control cell transmitted from a base station, the RRC layer signaling or the media access control cell carries therewith a correspondence between multimedia broadcast multicast service and a transport block serial number of a transport block corresponding to the multimedia broadcast multicast service; and an obtaining module 522 configured to obtain the correspondence between multimedia broadcast multicast service and a transport block serial number of a transport block corresponding to the multimedia broadcast multicast service according to the RRC layer signaling or the media access control cell.

Figure 10:
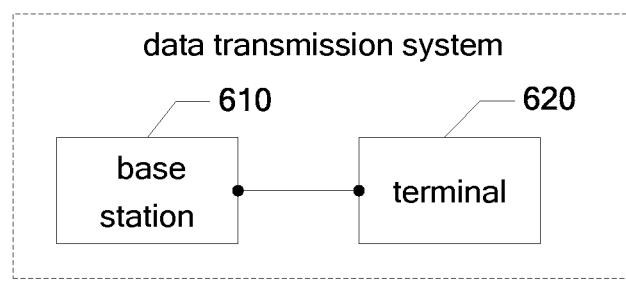
FIG. 10 is a schematic diagram illustrating the structure of the data transmission system provided by a tenth embodiment of the present invention.

FIG. 10 is a schematic diagram illustrating the structure of the data transmission system provided by the tenth embodiment of the present invention.

The embodiment of the present invention further provide a data transmission system, which comprises a base station 610 and a terminal 620—see the corresponding device embodiments discussed above for the specific structures of the base station 610 and the terminal 620, and these are not repetitively described in this context.

As should be noted, since information interaction and processes of implementing the various units and modules in the aforementioned devices are based on the same concepts as the method embodiments of the present invention, see the description in the method embodiments of the present invention for details, these are not redundantly described in this context.

As comprehensible to the ordinary skilled person in the art, the entire or partial flows achieving the methods of the aforementioned embodiments can be realized by a computer program instructing relevant hardware, and the computer program can be stored in a computer-readable storage medium, and can include the flows of the aforementioned method embodiments when executed. The computer-readable storage medium may be a magnetic disc, an optical disc, a read-only memory (ROM) or a random access memory (RAM), etc.

The data transmission methods provided by the present invention as well as the base station and the terminal for achieving the methods are described in detail above. To persons ordinarily skilled in the art, specific embodiments and scopes of application may be subjected to modifications within the spirits of the embodiments of the present invention, and contents of the Description shall not be understood as restrictive of the present invention.

What is claimed is:

1. A data transmission method, comprising:
obtaining a size of each transport block included in a subframe used for transmitting one or more multimedia broadcast multicast services (MBMSs);
obtaining a correspondence between the one or more MBMSs and transport block serial numbers of each of the transport blocks in the subframe;
obtaining, according to the correspondence, the transport block serial numbers corresponding to a needed MBMS; and
obtaining, according to the size of each of the transport blocks in the subframe, data of the needed MBMS from one or more transport blocks corresponding to the transport block serial numbers corresponding to the needed MBMS;
wherein the step of obtaining the size of each of the transport blocks included in the subframe used for transmitting the one or more MBMSs comprises one of the group consisting of:
querying a preset correspondence between a system bandwidth and a number of resource blocks included in each of the transport blocks, obtaining the number of resource blocks included in each of the transport blocks according to a current system bandwidth, and obtaining the size of each of the transport blocks according to the number of resource blocks included in each of the transport blocks;

receiving a message that includes a number of transport blocks included in the subframe, and calculating the size of each of the transport blocks according to the number of transport blocks;

receiving a message that includes a number of transport blocks included in the subframe and an index of a modulation coding scheme corresponding to the transport blocks, and obtaining the size of each of the transport blocks according to the number of transport blocks and the index of the modulation coding scheme corresponding to the transport blocks;

receiving a message that includes a number of resource blocks included in each of the transport blocks included in the subframe, and calculating the size of each of the transport blocks according to the number of resource blocks included in each of the transport blocks;

receiving a message that includes a number of resource blocks included in each of the transport blocks included in the subframe and an index of a modulation coding scheme corresponding to the transport blocks, and obtaining the size of each of the transport blocks according to the number of resource blocks included in each of the transport blocks and the index of the modulation coding scheme corresponding to each of the transport blocks; and wherein obtaining the size of each of the transport blocks according to the number of transport blocks and the index of the modulation coding scheme corresponding to the transport blocks comprising: subtract the index of the first resource block of a previous transport block from the index of the first resource block of a subsequent transport block to obtain the number of resource blocks included in each transport block, and then obtain the size of each transport block according to the number of resource blocks included in each transport block, wherein obtaining or calculating the size of each of the transport blocks according to the number of resource blocks included in each of the transport blocks comprising: resource blocks in each transport block have identical size, the terminal obtains the number of resource blocks included in the transport block, and then obtains the size of the transport block by multiplying the number of the included resource blocks with the size of the resource blocks.

2. The data transmission method of claim 1, wherein the step of obtaining data of the needed MBMS from the one or more transport blocks corresponding to the transport block serial numbers according to the size of each of the transport blocks in the subframe comprises obtaining data of the needed MBMS from the one or more blocks corresponding to the transport block serial numbers according to a number n of transport blocks included in the subframe used for transmitting the one or more MBMSs and the size of each of the transport blocks in the subframe, the method further comprising:

obtaining said number n, wherein n is an integer greater than one.

3. The data transmission method of claim 2, wherein the step of obtaining a number n of transport blocks included in the subframe used for transmitting the one or more MBMSs comprises one of the group consisting of:

querying a preset correspondence between a system bandwidth and a number of the transport blocks included in the subframe, and obtaining said n according to the current system bandwidth; and receiving a message that includes said n.

4. The data transmission method of claim 1, wherein the step of obtaining the correspondence between the one or more MBMSs and the transport block serial numbers of each of the transport blocks in the subframe comprises one of the group consisting of:

receiving, from a base station, the correspondence between the MBMSs and the transport block serial numbers of each of the transport blocks in the subframe via radio resource control (RRC) layer signaling; and receiving, from the base station, a media access control cell carrying the correspondence between the MBMSs and the transport block serial numbers of each of the transport blocks in the subframe.

5. A terminal, comprising:

a first obtaining engine configured to obtain a size of each transport block in a subframe used for transmitting one or more multimedia broadcast multicast services (MBMSs), comprises one of the group consisting of:

querying a preset correspondence between a system bandwidth and a number of resource blocks included in each of the transport blocks, obtaining the number of resource blocks included in each of the transport blocks according to a current system bandwidth, and obtaining the size of each of the transport blocks according to the number of resource blocks included in each of the transport blocks;

receiving a message that includes a number of transport blocks included in the subframe, and calculating the size of each of the transport blocks according to the number of transport blocks;

receiving a message that includes a number of transport blocks included in the subframe and an index of a modulation coding scheme corresponding to the transport blocks, and obtaining the size of each of the transport blocks according to the number of transport blocks and the index of the modulation coding scheme corresponding to the transport blocks;

receiving a message that includes a number of resource blocks included in each of the transport blocks included in the subframe, and calculating the size of each of the transport blocks according to the number of resource blocks included in each of the transport blocks;

receiving a message that includes a number of resource blocks included in each of the transport blocks included in the subframe and an index of a modulation coding scheme corresponding to the transport blocks, and obtaining the size of each of the transport blocks according to the number of resource blocks included in each of the transport blocks and the index of the modulation coding scheme corresponding to each of the transport blocks, wherein obtaining the size of each of the transport blocks according to the number of transport blocks and the index of the modulation coding scheme corresponding to the transport blocks comprising: subtract the index of the first resource block of a previous transport block from the index of the first resource block of a subsequent transport block to obtain the number of resource blocks included in each transport block, and then obtain the size of each transport block according to the number of resource blocks included in each transport block, wherein obtaining or calculating the size of each of the transport blocks according to the number of resource blocks included in each of the transport blocks comprising: resource blocks in each transport block have identical size, the terminal obtains the number of resource blocks included in the transport block, and then obtains the size of the transport block by multiplying the number of the included resource blocks with the size of the resource blocks;

a correspondence obtaining engine configured to obtain a correspondence between the one or more MBMSs and transport block serial numbers of each of the transport blocks in the subframe;

a serial number obtaining engine configured to obtain, from the correspondence, one or more transport block serial numbers corresponding to a needed MBMS; and a service data obtaining engine configured to obtain, according to the size of each of the transport blocks in the subframe, the data of the needed MBMS from the one or more transport blocks corresponding to the transport block serial numbers.

6. The terminal of claim 5, wherein the correspondence obtaining engine comprises:

a message receiving subengine configured to receive, from a base station via radio resource control (RRC) layer signaling or a media access control cell, the correspondence between the one or more MBMSs and the transport block serial numbers of each of the transport blocks in the subframe; and an obtaining subengine configured to obtain the correspondence between the one or more MBMSs and the transport block serial numbers of the transport blocks in the subframe according to the RRC layer signaling or the media access control cell.

7. The data transmission method of claim 1, wherein the step of obtaining the size of each of the transport blocks included in the subframe used for transmitting the one or more MBMSs comprises: resource blocks in each transport block have different sizes.

* * * * *